United States Patent [19]

Wang

[11] 4,005,935
[45] Feb. 1, 1977

[54] METHOD AND APPARATUS FOR PROVIDING A PHASE COMPENSATED OPTICAL BEAM

[75] Inventor: Victor Wang, Oxnard Beach, Calif.
[73] Assignee: Hughes Aircraft Company, Culver City, Calif.
[22] Filed: July 31, 1975
[21] Appl. No.: 601,123
[52] U.S. Cl. .................................. 356/5; 250/199; 330/4.3; 332/7.51; 356/106 R
[51] Int. Cl.$^2$ .......................................... G01C 3/08
[58] Field of Search ........... 356/5, 106 R; 250/199; 331/94.5 N; 332/7.51; 330/4.3

[56] References Cited
UNITED STATES PATENTS 3,731,103  5/1973  O'Meara ................................ 356/5
3,733,129  5/1973  Bridges .................................. 356/5

OTHER PUBLICATIONS

Nosach, JETP Letters, vol. 16, No. 11, pp. 617–621, Dec. 5, 1972.

Primary Examiner—Maynard R. Wilbur
Assistant Examiner—S. C. Buczinski
Attorney, Agent, or Firm—Lawrence V. Link, Jr.; W. H. MacAllister

[57] ABSTRACT

According to one herein disclosed embodiment, an initial uncompensated energy pulse is transmitted towards a remotely located target; a portion of the energy reflected from the target is received, processed so as to be back-scattered from a Brillouin mirror, amplified and then retransmitted along a path coincident with the received path. The backscattered energy from the Brillouin mirror is the complex phase conjugate of the received pulse and consequently the second transmitted pulse is phase encoded such that the effects of phase perturbations encountered along the received path are substantially canceled, and near diffraction-limited convergence of the beam upon the target is obtained.

14 Claims, 2 Drawing Figures

METHOD AND APPARATUS FOR PROVIDING A PHASE COMPENSATED OPTICAL BEAM

BACKGROUND OF THE INVENTION

This invention relates to the method and apparatus for providing spatial coherency of an energy beam at a remotely located target.

In energy transmission systems such as laser transmitting arrangements, for example, atmospheric inhomogeneities and/or phase unbalances across the aperture feed system causes undesirable spreading of the transmitted beam at a remotely located target. One technique for improving the spatial coherency of the transmitted beam at the target is disclosed in U.S. Pat. No. 3,731,103 wherein the beam is processed by N subapertures with continuous phase control being effected on the radiation from each subaperture. Although the approach of the just cited patent is perfectly suitable for many applications, the subject invention which provides beam correction by means of direct optical compensation is thought to be particularly advantageous inasmuch as its resolution is not limited by an arbitrary number of phase correction elements and its implementation is generally less complex.

SUMMARY OF THE INVENTION

A primary object of the subject invention is to provide a new and improved method and apparatus for compensating for the defocusing effects of phase perturbations encountered along the transmission path of an energy beam.

Another object is to provide a new and improved system for focusing an energy beam at a remotely located target by means which allow for an increase in resolution and a decrease in system complexity.

A further object is to provide a system for compensating for the effects of atmospheric perturbations on an energy beam and which possesses one or more of the following advantages over prior art techniques: simplicity of implementation; increased speed of response; higher resolution; and lower cost.

Yet another object is to provide a direct optical method for the compensation of atmospheric distortion without the use of electronic signal processing or moving parts.

A still further object is to provide means for compensating for the effects of atmospheric distortion of an electromagnetic beam which is particularly well suited to pulsed operation and which not only possesses great simplicity but provides near diffraction limited performance.

One embodiment of the subject invention utilizes a double pulse algorithm whereby an initial uncompensated pulse is transmitted to broadly illuminate the target and a portion of the pulse which strikes the target is returned by a "glint" thereon. The received pulse after being amplified by the system's main power amplifier is routed through a train of small signal coherent amplifiers. The output from the amplifier train is focused on a Brillouin mirror and a back-scattered beam is returned along the path of the incident beam. This pulse which is returned by the Brillouin mirror receives further amplification in passing through the amplifier train and the main power amplifier and is subsequently broadcasted at full power level once again through the telescope. This second transmitted pulse has phase information encoded thereon such that phase distortions induced by atmospheric turbulence, for example, are substantially negated by the impressed phase history and a near diffraction limited convergence of the beam at the target is obtained. Further, the system will automatically track the target's movements; i.e. within the system's "processing field of view", if the target should move from one location to another the system will automatically cause the beam to converge at the new location.

BRIEF DESCRIPTION OF THE DRAWINGS

The novel features of this invention, as well as the invention itself, will be better understood from the accompanying description taken in connection with the accompanying drawings in which like reference characters refer to like parts and in which.

DETAILED DESCRIPTION OF THE PREFERRED EMBODIMENT

Figure 1:
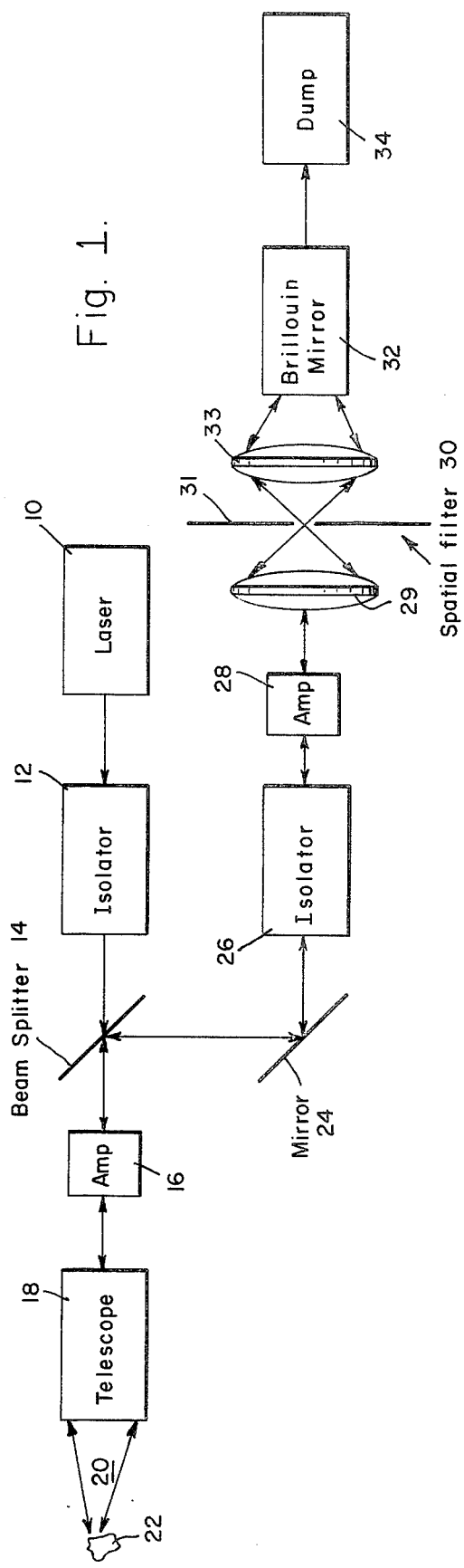
FIG. 1 is a block and schematic diagram of a preferred embodiment of an energy transmission system which provides direct optical phase compensation of a transmitted beam.

Referring first to FIG. 1, a laser unit 10 provides an initial pulse of electromagnetic energy which is applied through an isolator 12 and a beam splitter 14 to a high power amplifier 16. The output energy from amplifier 16 is focused by telescope 18 and then transmitted through a segment of the atmosphere, designated generally by numeral 20, to a remotely located target 22.

A portion of the transmitted energy is returned by one or more glints (areas of high reflectivity) on target 22. Telescope 18 receives a portion of the returned energy which is amplified by high power amplifier 16 and then applied by means of beam splitter 14, a mirror 24, an isolator 26, a train of small signal amplifiers 28 and a spatial filter 30 to one surface of a Brillouin mirror 32. Mirror 32 may be a cell of $CS_2$ material for 0.69 $\mu$m operation, for example.

The energy which is backscattered from Brillouin mirror 32 is returned exactly along the path of the incident beam applied thereto, i.e. through elements 30, 28, 26, 24, 14, 16 and 18. This backscattered pulse received amplification in returning through amplifiers 28 and 16 and is transmitted at the full power level once again through telescope 18. However, this second time the phase information encoded upon the wavefront is such that, upon passing through the atmosphere, the turbulence is exactly canceled by the "crinkled" wavefront and this results in near diffraction-limited convergence of the beam upon the target.

Isolators 12 and 26 may be of the saturable absorber type which operate as thresholding devices so as to only pass energy that is above a preselected power level. The purpose of these isolators is to reduce parasitic oscillations within the system.

Spatial filter 30, which improves the system signal to noise ratio, might comprise a lens 29 for focusing the received energy through an aperture in a plane of opaque material 31 (image plane stop). Lense 33 focuses the energy from the image plane stop on to Brillouin mirror 30. An energy trap or "dump" 34 absorbs unused energy, which is transmitted through the mirror.

It is noted that phase distortions encountered by the initial illuminating pulse from laser 10 do not have "first order" relevance to the operation of the system inasmuch as the returned energy from a glint on a distant target may be considered a "point source" which initiates a plane wavefront return signal. Also in accordance with the invention, if the target independently radiates energy in the frequency bandwidth of the system it is not necessary to illuminate the target. Similarly, in the active illumination mode it is not necessary that the laser pulse transverse the exact same path as the received signal.

In accordance with the invention, correction for distortions encountered in the transmission path is effected by simulated Brillouin scattering from mirror 32. It has been demonstrated that the backscattered light from simulated Brillouin scattering is the complex phase conjugate of the incident pulse, see article "Cancellation of Phase Distortions in an Amplifying Medium with a 'Brillouin Mirror'," O. Yu, V. I. Popovichev, V. V. Ragul'skii, and F. S. Faizullov, P. N. Lebedev Physics Inst. USSR Academy of Sciences, submitted Nov. 2, 1972, ZhETF Pis. Red. 16, No. 11, 617–621 (Dec. 5, 1972). As described in the just cited article the simulated Brillouin scattering principle has been employed to correct the phase distortion introduced by an optically inhomogeneous ruby laser amplifier rod. In that system, an oscillator pulse is passed one way through a rod, reflected by simulated Brillouin scattering (with up to 70% efficiency), and passed in the opposite direction a second time so as to cancel distortion introduced the first time.

Figure 2:
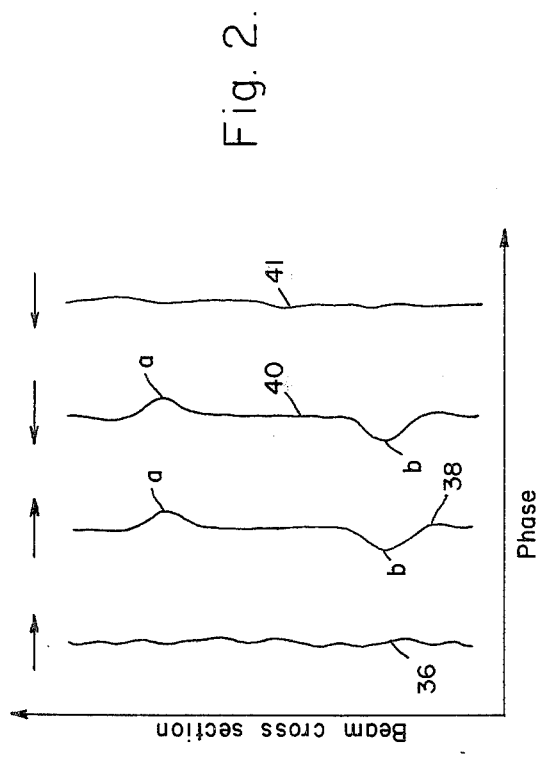
FIG. 2 illustrates waveforms useful for explaining the function of the Brillouin mirror of FIG. 1.

Operation of the system of FIG. 1 may be better understood by referring to the waveforms of FIG. 2 which depict the phase fronts of an extremely simplified example. Prior to passing through the atmosphere the energy returned from the target has an undistorted "flat" phase front, see waveform 36. The effects of the atmospheric distortions are simply depicted in waveform 38 by segments a and b which lead and lag, respectively, the main portion of the waveform. On being backscattered from Brillouin mirror 32 the wavefront is, as shown in waveform 40, the complex phase conjugate of waveform 38. On this last point it should be noted that on being reflected from Brillouin mirror 32 the wavefront represented by waveform 40 is traveling in the opposite direction from that of waveform 38 and therefor points a and b of waveform 40 are lagging and leading, respectively, the main portion of the wavefront. Hence, the phase perturbations in waveform 40 are opposite from the corresponding phase displacements of waveform 38. Consequently, in passing through the same atmospheric distortions as experienced by the received pulse of waveform 38, the pulse of waveform 40 will have the plane wavefront of waveform 42 when it arrives at target 22, i.e. the beam approaches diffraction-limited convergence at the target.

The theory of simulated Brillouin scattering is known in the art, but to very generally summarize, the high intensity incident optical fields modulate the density of the material of the Brillouin mirror and produces acoustic waves, the phase fronts of which map the phase front of the optical pulse. The phase hologram so created reflects a phase front that has the conjugate phase front from what would be reflected from a plain mirror. It is noted that the backscattered wavefront from mirror 32 is shifted in frequency by an amount proportional to the velocity of the acoustic waves in the Brillouin mirror. This doppler frequency shift should be considered in selecting the bandwidth of the system components especially if many more than two pulses on target are intended per operational cycle. On this last point it should be understood that in the embodiment of FIG. 1 after the initial pulse is delivered by laser unit 10, compensated pulses will continue to be periodically transmitted to the target with the interpulse period thereof approximating the round trip propagation time to the target, until something is done to inhibit the system's operation, such as interrupting the "pumping" of amplifiers 16 and 28, for example.

An alternate way of "visualizing" the system of FIG. 1 is to regard it as a "long laser" with the target and simulated Brillouin scattering cell (mirror 32) being retro-reflectors. A discussion of long laser devices is provided in the article "Very Long Lasers", Gary J. Linford, Eugene R. Peressini, Walter R. Sooy, and Mary L. Spaeth, Applied Optics, Vol. 13, No. 2, February 1974. However, this just cited system does not use a "special" mirror of phase conjugate reflection as does the subject invention. Another viewpoint is to regard the subject system as a real time phase compensating holograph technique for error cancellation.

Thus having disclosed a new and improved method and apparatus for compensating for the defocusing effects of phase perturbations encountered along the transmission path of an energy beam, what is claimed is:

1. A system for applying energy to a remotely located target such that the energy beam is compensated for the effects of phase perturbations encountered along the path to the target, said system comprising:
   first transmission means for transmitting a beam of electromagnetic energy to the target;
   means for receiving energy which is returned from the target along a given path;
   optical processing means for backscattering said received energy so as to produce therefrom energy which is the complex phase conjugate of the received energy; and
   second transmission means for transmitting said complex phase conjugate energy along said given path to the target;
   whereby said complex phase conjugate energy beam is compensated for the effects of phase perturbations encountered along said given path and is therefore substantially focused at the target.

2. The system of claim 1 wherein said optical processing means comprises a Brillouin mirror disposed so that said received energy is backscattered therefrom.

3. The system of claim 2 including amplifying means for providing amplification of the energy applied to and backscattered from said Brillouin mirror.

4. The system of claim 3 including an isolator disposed in the path of the energy applied to and backscattered from said Brillouin mirror.

5. The system of claim 3 including a spatial filter diposed in the path of the energy applied to and backscattered from said Brillouin mirror.

6. The system of claim 1 wherein said first transmission means includes a laser unit adapted for pulsed operation.

7. The system of claim 6 wherein said first transmission means includes an isolator disposed in the path of the output energy from said laser.

8. A system for applying energy to a remotely located target such that the energy beam is compensated for the effects of phase perturbations encountered along a path to the target, said system comprising;

means for receiving energy from the target along a given path;

optical processing means for backscattering said received energy so as to produce energy which is the complex phase conjugate of the received energy; and transmission means for transmitting said complex phase conjugate energy along said given path to the target;

whereby said transmitted complex phase conjugate energy beam is compensated for the effects of phase perturbations encountered along said given path and is therefore substantially focused at the target.

9. The system of claim 8 wherein said optical processing means comprises a Brillouin mirror disposed so that said received energy is backscattered therefrom.

10. The system of claim 9 including amplifying means for providing amplification of the energy applied to and backscattered from said Brillouin mirror.

11. A method for applying energy to a remotely located target so that the energy beam is compensated for the effects of phase perturbations encountered along a path to the target, said method comprising the steps of:

receiving energy from the target along a given path;

optically processing said received energy by applying it to a device which backscatters energy which is the complex phase conjugate of the received energy; and transmitting said complex phase conjugate energy along said given path to the target;

whereby said transmitted complex phase conjugate energy beam is substantially focused at the target.

12. The method of claim 11 wherein said optical processing step includes applying said received energy to a Brillouin mirror and said transmitting step includes transmitting the resultant energy which is backscattered from said Brillouin mirror.

13. The method of claim 11 further comprising the step of initially illuminating said target with electromagnetic energy.

14. The method of claim 11 further comprising the step of initially illuminating said target with a pulse of optical energy.

* * * * *